Figure 1:
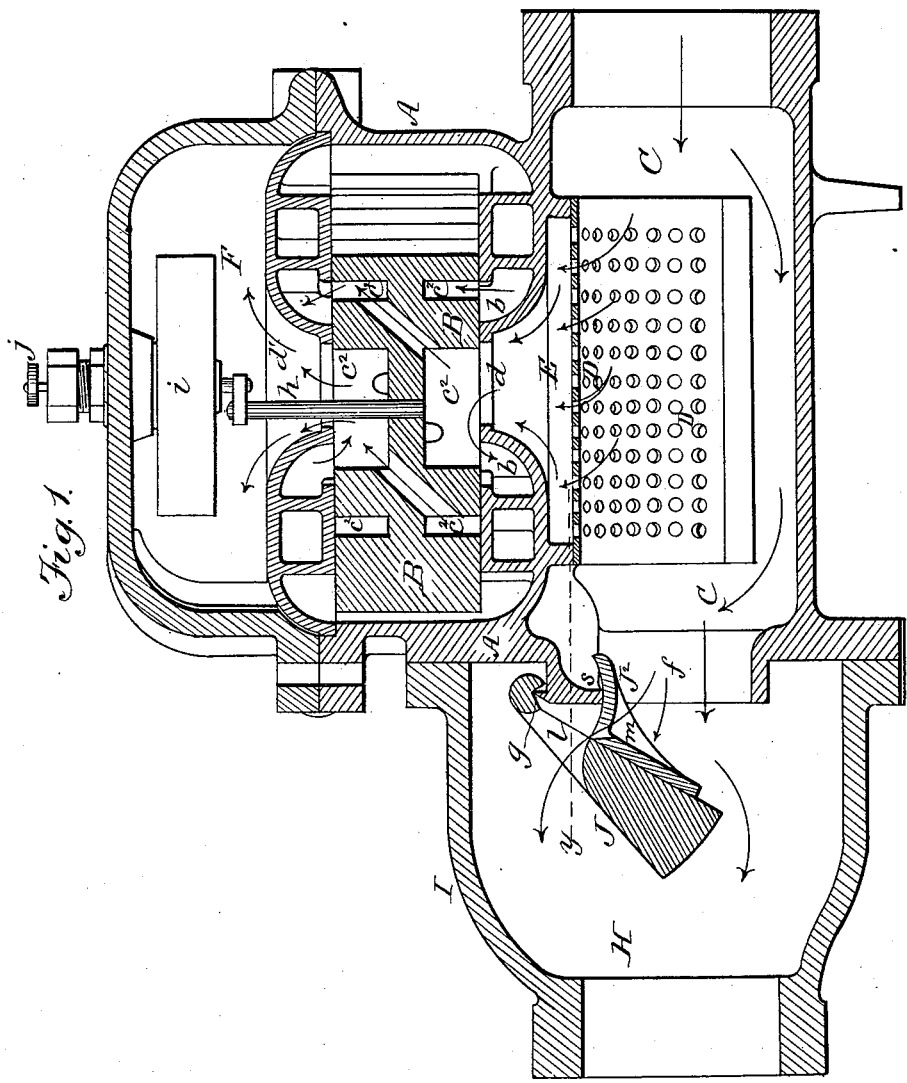

(No Model.) 4 Sheets—Sheet 1.
L. H. NASH.
PROPORTIONAL WATER METER.

No. 336,146. Patented Feb. 16, 1886.

Witnesses:
D. E. Grant
G. E. Tucker

Inventor:
Lewis Hallock Nash
by Johnson and Johnson
Attys.

(No Model.)  4 Sheets—Sheet 2.

L. H. NASH.
PROPORTIONAL WATER METER.

No. 336,146.  Patented Feb. 16, 1886.

Witnesses:
R. E. Grant
G. E. Tucker

Inventor:
Lewis Hallock Nash
by Johnson & Johnson
Attys.

(No Model.) 4 Sheets—Sheet 3.

L. H. NASH.
PROPORTIONAL WATER METER.

No. 336,146. Patented Feb. 16, 1886.

Witnesses:

Inventor:

(No Model.) 4 Sheets—Sheet 4.

L. H. NASH.
PROPORTIONAL WATER METER.

No. 336,146. Patented Feb. 16, 1886.

Witnesses:
C. E. Traut
G. E. Tucker

Inventor:
Lewis Hallock Nash
by Johnson and Johnson
Attys.

United States Patent Office.

LEWIS HALLOCK NASH, OF BROOKLYN, ASSIGNOR TO THE NATIONAL METER COMPANY, OF NEW YORK, N. Y.

PROPORTIONAL WATER-METER.

SPECIFICATION forming part of Letters Patent No. 336,146, dated February 16, 1886.

Application filed November 30, 1885. Serial No. 184,330. (No model.)

*To all whom it may concern:*

Be it known that I, LEWIS HALLOCK NASH, a citizen of the United States, residing at Brooklyn, in the county of Kings and State of New York, have invented new and useful Improvements in Proportional Water-Meters, of which the following is a specification.

My invention relates to water-meters constructed to divide the influent volume into two streams, each of which passes a definite proportion of the flowing volume, one of which is measured, and the measurement of the volume of both streams determined by such measured part by a registering device suited for the purpose.

The particular matter of improvement in such meter is a construction and combination of swinging weighted valves for each stream, adapted to cause a definite resistance to the flow of each stream, and means for varying the proportional areas of the discharge-orifices to regulate the proportional quantity of the water flowing in each stream for every rate of delivery of the meter.

My object is to render the measuring action in a proportional water-meter certain and unchangeable under all the changing conditions which occur in use, so that the registration of the measuring device will not be affected to any appreciable extent by the varying resistances to its action caused by foreign substances in the water, or by the frictional resistances of the moving parts, and to control and measure the flow by causing a definite resistance to the flow of both streams, so as to overbalance the variable resistances in the separate streams and of the measuring device.

Hitherto the improvements in proportional meters have been directed to means whereby the resistance of the measured current, in passing through the measuring device and its connecting passages, is balanced by an equal resistance placed upon the flow of the main current, so as to exactly balance the resistances against each other, and thereby cause a definite proportion of the flow to pass through each channel. Various means for accomplishing this result have been proposed as by forming resistance-passages in the main current by causing a valve or valves to vary the size of the orifices through which the two currents pass, and thereby regulate the flow in each channel, and various other similar devices, all designed to balance the two streams, one against the other, and thereby to regulate the proportional discharge of the two streams. By such means proportional meters have been produced which have not given good results when tested for accuracy of registration, as the fault of all such meters hitherto constructed, so far as I know and can find, is that they are liable from slight and unascertained causes to change their rate of registration, so that they are unreliable as a means for accurately measuring water. This uncertainty in the registration of this class of meters has heretofore prevented them from being of any practical value, and therefore they have never come into use.

After a series of experiments and careful tests I have been able to produce a proportional meter which gives an unchanging registration, and which is as reliable in its operation as any meter of the class in which the whole stream passes through the measuring mechanism.

The principles of construction and operation of my new meter I will now state. The resistance offered to the flow of the water in the metered channel is of two kinds: first, the force required to move the working parts of the measuring device and of the registering mechanism, and, second, the hydraulic resistance to the flow of the water in the passages. In the main stream the resistances are all of the second kind. The influences that tend to vary the amount of these resistances are in the first case variations in the frictional resistance of the moving parts due to wear, the deposit of sediment, friction of the stuffing-box, and other resistances directly due to the moving parts of the measuring device. These resistances are different in different positions of the parts of the measuring device, as they are constantly changing, being greater or less as effected by minute causes and by the wear of the parts. These variations in the resistance of the moving parts do not appear to serious disadvantage in meters wherein the whole volume of the water acts to drive the moving parts, because the force of the flowing current is so much greater than the resistances of the meter that these variable resistances are of such comparative insignificance as to be unimportant; but when a large portion of the water passes through a free channel these variable resistances cause a greater or less quantity of water to pass through the main channel, and hence in a proportional meter these matters are of vital importance, and their most serious effects are seen when the meter is operating under a very small rate of flow. Under such condition the hydraulic resistances caused by the flow of the water through the passages becomes very small and is hardly perceptible, while the whole effect of the resistance of the moving parts in the measuring device is exerted in effecting the registration of the device.

The resistance of the moving parts of a measuring device of approved design is very minute, and may be stated in a good example to be on the average equal to a hydraulic head of one-eighth of an inch. This resistance will differ at different times, even under favorable conditions, so as to vary from one-sixteenth of an inch head to one-fourth of an inch head. The second kind of resistances, due to the hydraulic friction of the flowing currents, are more constant, but even they are subject to change from the deposit of sediment or foreign matter in the channels, and the resistances are very great under large rates of flow, but become very small with small rates of flow; hence the resistances to be balanced are in the measured current—viz., the resistance of the moving parts plus the hydraulic resistance of the current, which must equal the hydraulic resistance in the main channel plus an artificial resistance added to balance. When the meter is delivering a large quantity of water, the hydraulic resistances become very great compared with the other resistances, so that they are the controlling forces controlling the delivery of the two currents, and by causing the two streams to pass through given-sized orifices, so that the greater part of the resistance of the currents is caused at the orifices, these resistances will be rendered quite permanent, and the meter will be reliable for large rates of flow; but as the quantity of water delivered by the meter is lessened, the hydraulic resistances rapidly decrease until upon the smaller rates their influence is imperceptible, and then the only resistance to be considered is that of the meter working parts. Since this resistance is liable to change, it follows that if we form a balance between the resistance of the meter working parts and an equal resistance upon the main stream, as is the usual practice, by regulating the relative size of the discharge-orifices or causing a resistance to the flow of the main current as soon as the resistance of the moving parts change from wear or other causes, the registration of the meter upon the small streams will correspondingly change.

My invention remedies this result by placing a definite resistance upon the measured stream, which is so many times greater than the resistance of the moving parts of the meter that the variations in the latter resistances of said moving parts are only a small proportion of the total resistance in said stream, and hence these variable resistances cannot affect the registration of the meter to any injurious extent. An equal resistance is placed upon the flow of the large stream, and thus the flow in the two streams is controlled by causing each stream to overcome an equal resistance to its flow of a magnitude so much greater than the variable resistances of the two streams as to overpower the disturbing effect of the variable resistances. To illustrate this point, suppose that the resistance to the flow of the water in the measured stream were equal to one-eighth of an inch head, and that the main channel was provided with an equal resistance, then if from any cause the resistance to the flow in the measured channel should be increased to one-quarter-inch head, the water would find a much easier passage through the main channel in which a resistance of only one-eighth of an inch head had been provided, and the meter would only register a small portion of the proper amount; but if, as proposed by me, in addition to the resistance of one-eighth-inch head, I provide an additional resistance of one foot head, then the total resistance to the flow in the measured stream would be $\frac{1}{8}+\frac{96}{8}=\frac{97}{8}$ of an inch head, which will be balanced in the main channel by an equal resistance of $\frac{97}{8}$. If, now, the resistance of the measuring device increase to one-quarter head the total resistance will be $\frac{98}{8}$, which is partially balanced by the resistance in the main channel of $\frac{97}{8}$. Hence, while in the former case the resistance in the measured and in the main channels were in the proportion of two to one, under the same conditions, by my improvement, the ratio would be as ninety-eight to ninety-seven, conditions much more favorable to accuracy. By suitably increasing the definite resistances any desirable degree of accuracy can be obtained.

In order to carry out the foregoing method of measuring water, I have designed the proportional meter shown in the drawings, in which—

Figure 2:
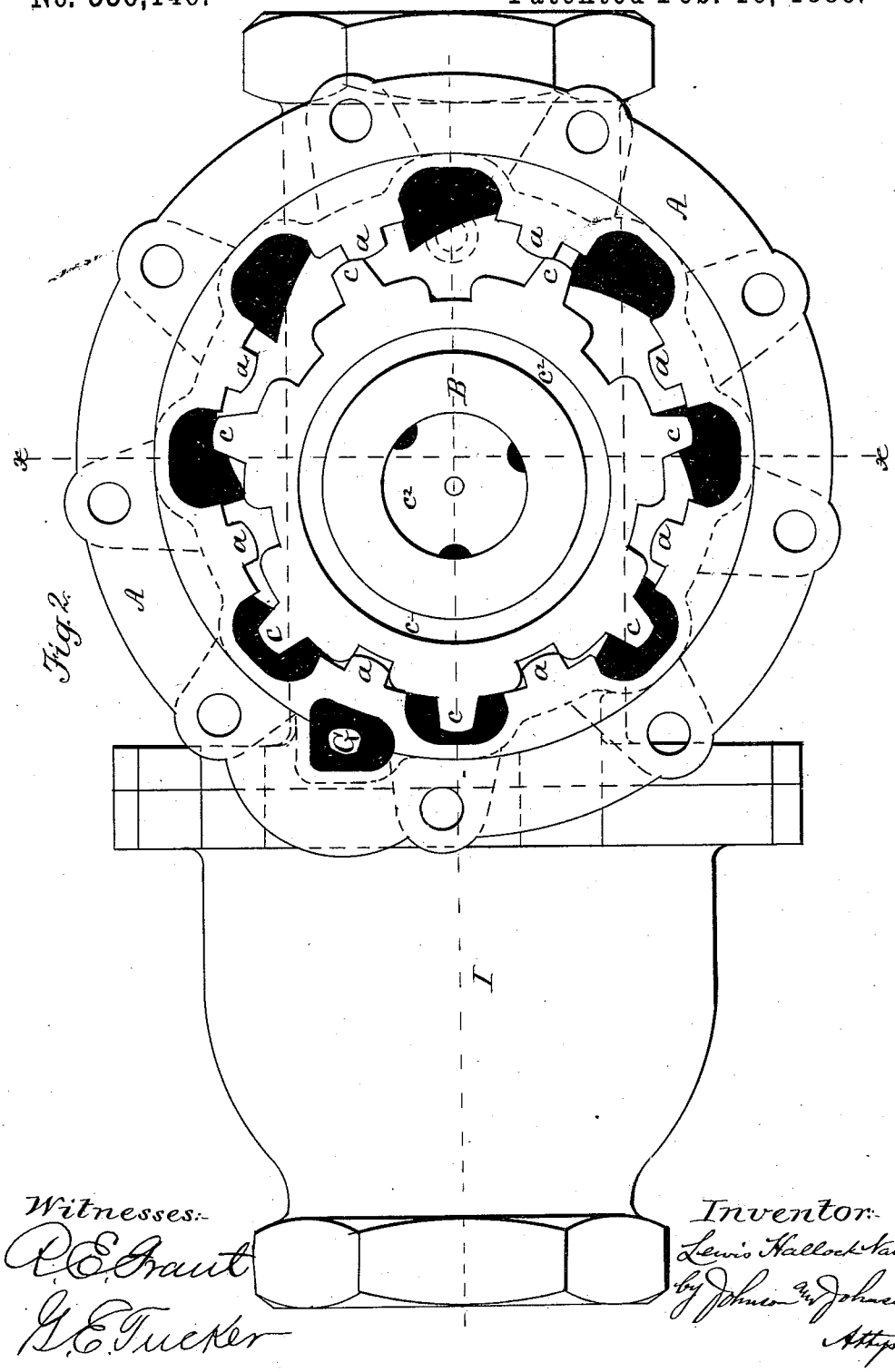
Figure 3:
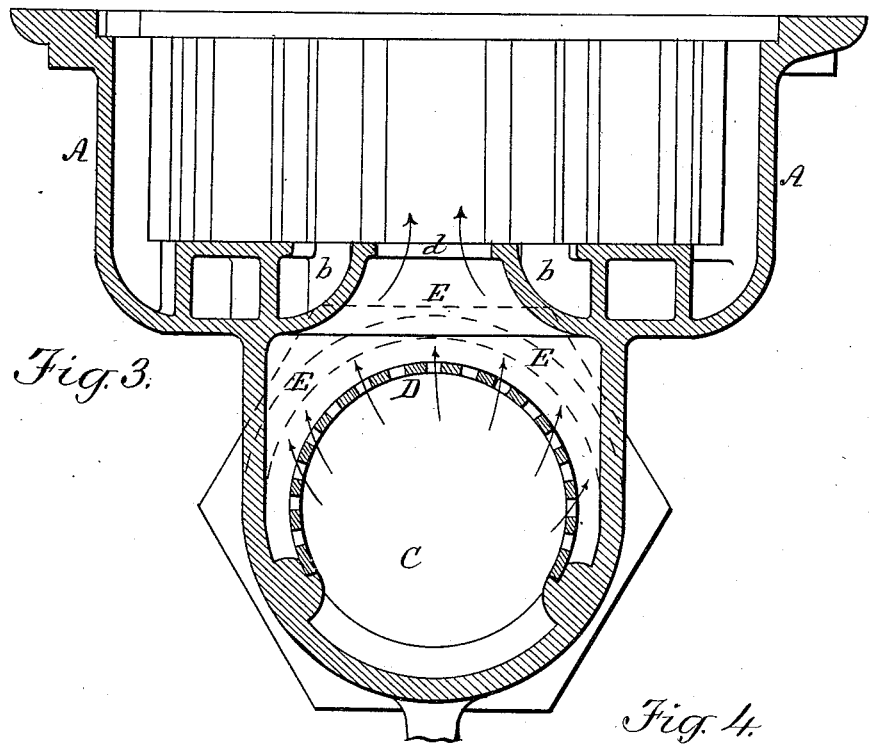
Figure 4:
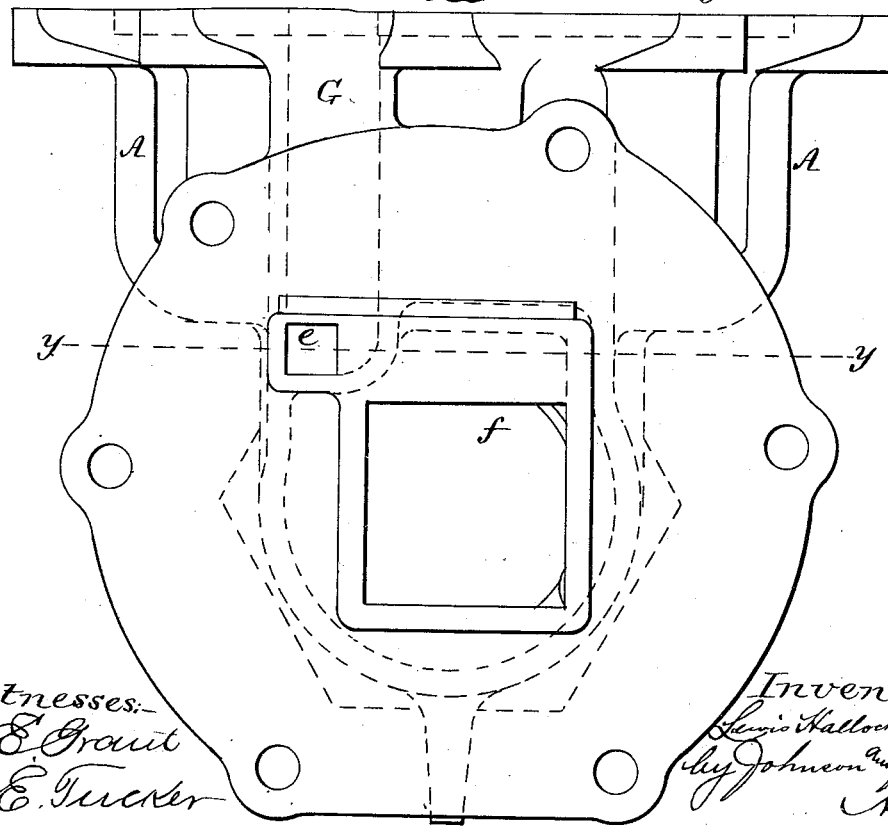
Figure 5:
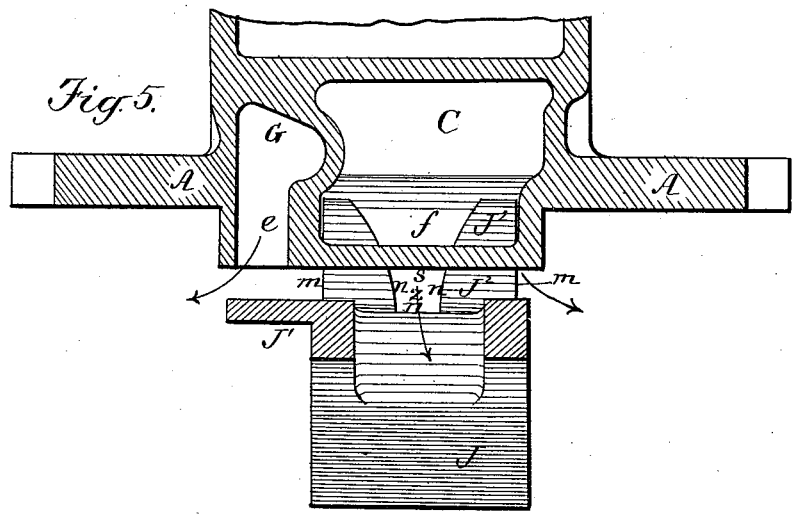
Figure 6:
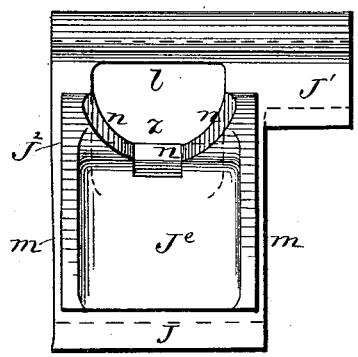
Figure 7:
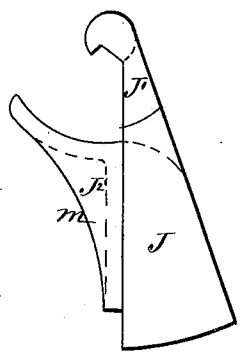
Figure 8:
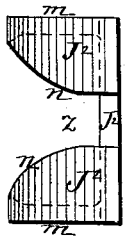

Figure 1 represents a vertical section of the complete meter. Fig. 2 is a top view, the meter-cover being removed to expose the piston in top view. Fig. 3 is a section on the line $x\ x$ of Fig. 2. Fig. 4 is an elevation of the case with the outlet-valve chamber-passage and its contained valve removed, showing the discharge-ports of the two streams. Fig. 5 is a section on line $y\ y$ of Figs. 1 and 4. Fig. 6 is a view of the inner side of the swinging weighted valve. Fig. 7 is an edgewise view of the valve; and Fig. 8, a top view of the divided wing or lip of the valve by which to determine the proportional area of the discharge-orifices of the two streams.

I use a measuring device of suitable construction, through which the measured stream flows, and in the present case I make use of a meter known in the trade as the "crown" meter, for which Letters Patent were granted to me January 21 and 28, 1879, numbered, respectively, 211,582 and 211,769, a full and particular description whereof is deemed unnecessary, and to which reference is made as illustrating one form of meter to which my improvements are applied.

As shown in the accompanying drawings, the measuring device consists of a case, A, formed with interior alternate wall-bearing projections $a$, and recesses and case ports $b$, and the piston B, as having similar alternate projections $c$ and recesses, by which the chamber of the case is divided into receiving and discharging measuring-spaces by the operation of the piston, which has epicycloidal movement about the center of the case. The piston carries a spindle, $h$, which connects with and drives the registering mechanism through the intermediate gearing contained in the box $i$, which operates the gear $j$, which connects the dial mechanism. The piston has ports $c^2$, which co-operate with the case-ports $b$ to effect the inlet and discharge into and from the measuring-spaces of the case, as shown and described in my said patents.

The main-flow channel is formed under the case A, and a segmental screen, D, is placed therein, covering the passage E, which connects with the meter proper. The measured current passes through the screen into the measuring device, at $d$, above the screen, as shown by arrows, and escapes through the piston-ports and through the opening $d'$ into the chamber F and passage G, Fig. 2, to the port $e$, Fig. 4. The main current passes through the channel C and washes the surface of the screen D in its passage to the outlet-port $f$. The outlet-chamber H is formed by a separate cover, I. The controlling-valve J swings within this outlet-chamber to operate the discharge-orifices $e$ and $f$. The valve J swings upon a knife-edge bearing, $g$, and is formed with two lips or wings, the one, J, operating the main passage $f$, and the lip or wing J' operating the port $e$, and it is provided with a divided adjusting lip or wing, $J^2$, on its side next the direction of the flow, which is designed to vary and determine the proportional area of the discharge-orifices of the two streams, substantially as set forth in my applications for Letters Patent filed September 4, 1885, under Serial Nos. 176,159 and 176,160. The valve J is formed of a heavy weight, and its action is to close the ports $e$ and $f$ so that no water can pass through them without lifting the dead weight of the valve. Hence no water can flow through the device without overcoming the resistance to its flow caused by the weight of the valve J. I prefer to form the valve so that the weight of it shall offer about one hundred times the resistance to the flow of the water which is offered by the moving parts of the measuring device, and therefore, as hereinbefore stated, the effect of the variable resistances of the moving parts will be only one per cent. of the total resistance to the flow, and the consequent registration of the devices will be practically perfect.

I prefer to hang the weighted valve upon a knife-edge bearing, so as to swing outward with the flow, as it has the advantage of great durability and of being entirely without friction; but the valve might be formed with a pivoted bearing with the same action.

The action of the lip or wing extension $J^2$ is as follows: If the wing or piece $J^2$ were removed, the construction of the valve-lips J and J' is such that the areas of the port-openings, through which the water would escape, would always bear a definite proportional ratio to each other; but it has been found in practice that a definite proportion of the flowing currents will not always be controlled by causing them to pass through orifices that bear a constant proportional area to each other, and that in order to secure the result of a definite ratio between the flowing streams, it is necessary to provide that the relative size of the discharge-orifices for the two streams have a changing ratio for different rates of flow, which relation is determined by actual experiment to be that ratio which will pass the required quantity of water under the given conditions. For the purpose of thus determining the relative size of the discharge-orifice, I provide the extending lip or tongue $J^2$, which is of such shape as to close off a portion of the port of the main stream. As shown in Fig. 1, the water escapes from all sides of the valve J, except where the edges $m$ of the piece $J^2$ closes the opening.

The lip $J^2$ is formed with an opening, $z$, and has side walls, $m\ m\ n$, and as it swings under the outlet-port edge S the area of the opening $z$, through which the water can pass, is bounded by the edges $n\ n\ n$ S. By suitably forming the walls $m\ m$ and $n\ n$ of the lip or tongue piece $J^2$ we may provide any desired area for the discharge of the water from under the sides of the valve J, so that the relative proportional area for the discharge of the water from the two streams may be varied for every position of the swinging valve, and such a relation established as will insure the passage of the required proportion of the flowing current. This matter of varying the proportional areas of two streams, which is the subject of my applications filed as aforesaid, and of my applications filed June 22, 1885, under Serial Nos. 169,389, 169,390, and 169,391, is herein combined and used in connection with the resistance-valves for the purpose of controlling more perfectly the relative flow of the streams.

The drawings show the valve as being hung upon a knife-edge bearing at the top of the outlet-port $f$, so that the outflow from the latter will cause the valve to swing away from and open said port. The valve has an opening, $l$, just below its point of suspension, and the case-wall $s$ at the top of the port $f$ stands down, so that the outflow from the case at $f$ must pass under said port-wall to have an outflow through the top opening in said valve. The divided wings $J^2 J^2$ of the valve-piece are curved at their top surfaces, so as to conform to an arc struck from the valve-bearing point and from a contact-joint with the top edge of the port $f$, so that as the valves swing outside of the port the divided wing of the valve-piece moves within the top of the said port, so as to form a joint at three points—viz., at the vertical walls of the port by the right-angled sides $m$, and at the port edge S by the divided top part of the said valve-piece. The wings $J^2 J^2$ are straight at their outer edges, and, as shown, the inner edges are curved flaring in a direction toward the inlet of the case, so that as the valve moves farther into its chamber H the space or opening $z$ between the wings $J^2 J^2$ will increase in area and diminish as it moves in an opposite direction to close the outlet-port; but this construction may be changed according to the tests.

As shown in Fig. 5, the valve-wing J' stands to one side from the top, so as to operate the port $e$, which is at one side of the port $f$ at its top, and communicates with the chamber F by the vertical passage G. (Shown in Figs. 2 and 4.)

The valve J itself forms the weight, and its heaviest part is at its swinging end, and I prefer to hang it so that in its normal or closed position it will stand vertical with its opening $z$, closed by the port-wall $s$, and the divided wing extending entirely within the main passage. The port $e$, as shown, is of less area than the port $f$, and the two valves are of unequal area.

The operation of the meter is as follows: Water enters from the inlet-passage, and a portion of it goes through the screen D and the measuring device, by which it is measured, passing out through passages $d'$, F, and G to the port $e$, at which point it is obliged to force its way under the valve wing or lip J', while the main portion of the water passes through the channel C to the port $f$, lifting and passing under and through the opening in the valve J. Since the lip or wings J and J' are formed in one piece, the resistance offered to the flow of each stream will be the same. The method of causing an equal resistance to each stream could, however, be carried out by valves of different forms and by separate valves for each stream by so proportioning the weight of the two valves as to cause an equal resistance to the flow of the currents; but it is easier to effect an equal resistance for each stream by rigidly connecting the two valves.

I have shown, Figs. 1 and 3, a screen, D, seated in bosses in the main channel in the shape of a portion of a cylinder or inverted perforated trough for separating the water flowing into the metered passage, and I prefer to make it in the shape shown, so that the metered passage E will extend all around the screen from near the bottom of the main passage C, and thereby give a very free flow to the metered passage. In this case the main current flows within the cylindrical screen, but the screen is not carried around on the bottom of the channel, so that heavy substances which may enter the channel will be carried along the smooth bottom of the channel without a chance of being forced through the screen into the metered passage. The object of thus forming the screen in a cylindrical shape is to obtain large screening-surface that will not require an enlarged space for its reception, which would be the case if a flat screen of equal capacity were used.

It is obvious that the smaller valve, J', may be provided with an orifice-controlling lip similar to that of the main valve; but since it is only necessary to vary the proportional area of the two discharge-openings this can be effected by the action of one as well as by the action of both valves.

I am aware that in Patents Nos. 168,528 and 168,854 it is proposed to control the proportional flow of two streams by means of valves which operate to open the discharge-orifices in such a manner that the area of said openings will always bear a constant proportion to each other. In these patents the valve or valves operate to open the discharge-ports for each stream proportionally in such manner that whatever may be the position of the valves "the relative size of the lower and upper openings (or ports) will always bear the same proportion to each other." Therefore to accomplish this purpose it was not necessary in these patents that the valve should always occupy the same position under the same rate of flow, since the area of the port-openings must always bear the same proportion in all positions of the valve. For such purpose a spring is sufficient to close the valve against the pressure of the flow, so that the port areas of the two streams should always bear constant proportion to each other, and variations in the tension of the spring cannot change this result; but, as a matter of fact, definite proportions of water will not always flow through port-openings which have a definite proportional relation, because, as I have demonstrated by actual tests of such method, the proportional quantity of water delivered varies with every variation in the rate of delivery and position of the valves, and accurate registration of the whole volume of flow cannot be obtained.

Tests under my method herein described have determined that in order that a definite proportional quantity of water under a given rate of flow should pass through in two streams, the positions of the valves, the pressure of the flowing streams, and the size of the discharge-openings must be the same, and that these conditions must be determined for every rate of flow by the weight and form of the valves. It is in these important particulars that my method differs from the operation of the meters in the patents aforesaid. My method differs from the operation of these patents in that I provide, first, for an excessive definite resistance to the flow of the water through the discharge-orifices, which resistance shall always be the same under the same quantities of flow by a weighted swinging valve; and, second, by varying the proportional size of the discharge-orifices for every rate of flow, so as always to pass the required proportional quantity of water in each stream under given conditions of flow previously determined by tests.

In my applications aforesaid, Nos. 176,159 and 176,160, I use coacting swinging valves to operate ports to vary the proportional port-openings of the streams for every rate of flow, and in which the valves must necessarily offer but slight resistance to the flow of the water by reason of being balanced; but by actual tests I found that the registration varied under the same conditions of flow. It was under such tests that I discovered the necessity of having a weighted instead of a balanced or light valve.

As the invention herein is directed to the mechanism in certain particulars and the cooperating elements for measuring water flowing in divided streams, I have, of even date herewith, filed an application for a patent claiming the method herein described of measuring water in which a definite resistance to the flow of both streams is caused so as to overbalance the variable resistances in the separate streams and of the measuring device.

It is not intended to claim herein, broadly, a flow-controlling valve for divided streams having a determined weight for the purpose of offering a definite and unchanging resistance to the flow of each stream, so that such resistance will always bear the same relation under the same rates of flow and greater than the resistances to the flow of the currents in the passages and in the measuring device, whereby the discharge-ports are operated so that their areas shall always bear a constant and fixed ratio or proportional area to each other; but in connection with such resistance provision my invention also embraces coacting swinging valves and provision for varying the proportional areas of the discharge-orifices for every rate of flow.

I claim—

1. The combination, in a water-meter in which the influent volume is divided into two streams, one of which is measured, of a case having a separate outflow-port for each stream, with a swinging valve having a determined weight to offer a definite and unchanging resistance to the flow of each stream, substantially as described, for the purpose specified.

2. The combination, in a proportional water-meter, of a swinging weighted valve for resisting the flow of both streams, with means, substantially such as described, for varying the proportional areas of the discharge-orifices to regulate the proportional quantity of the water flowing in each stream for every rate of delivery of the meter.

3. The combination, in a proportional water-meter, of the swinging weighted valve J J', the knife-edge bearing for said valves, and means for varying the proportional areas of the discharge-openings for each stream, substantially as described.

4. The combination, in a proportional water-meter, of a swinging weighted valve, pivoted horizontally, with the internally-projecting wings or lip-piece for regulating the proportional area of the discharge-orifices of the streams, substantially as described.

5. In a proportional water-meter, the combined valve J J', the knife-edge bearing $g$, and the wing or lip $J^2$, operating substantially as described, for the purpose stated.

6. The combination, with the outlet-ports $e$ $f$, of a proportional water-meter, of a swinging weighted valve having an opening, $l$, and an inwardly-projecting face-wing having a flaring opening, $z$, joining that in the valve, and the outlet-port wall $s$, substantially as described, for the purpose specified.

7. The weighted swinging valve J, having the opening $l$, the side wing, J', the inwardly-projecting curved wings $J^2 J^2$, and the angled sides $m$ $m$, in combination with the case-port walls $s$, the chamber H, and the ports $e$ and $f$, substantially as described, for the purpose specified.

8. The combination, in a proportional water-meter, of discharge-ports of unequal area, with coacting swinging valves therefor, one of which is adapted to permit the outflow under and over it from the port of greatest area, substantially as described, for the purpose specified.

9. The combination, in a water-meter in which the influent volume is divided into two streams, one of which passes through the operating-meter device, of a case having a separate outflow for each stream, with a fixed segmental screen arranged to form an extended screening-surface for the metered passage, substantially as described.

10. The combination, in a water-meter in which a divided influent volume is measured by the measurement of one division thereof, of a case having a separate outflow-orifice for each stream, with a fixed inverted segmental screen having a free-flow space formed by said case around and over said screen, communicating with the metered passage, substantially as described.

11. The combination, with the meter-case having the flow-passage C, and the meter-operating device arranged in a chamber communicating with said passage, of the segmental screen D, arranged to form the upper walls of said flow-passage having a surrounding flow-space, E, communicating with said meter-operating device, whereby to give a free flow to the meter device and exclude foreign substances therefrom, substantially as described.

In testimony whereof I have hereunto set my hand in the presence of two subscribing witnesses.

LEWIS HALLOCK NASH.

Witnesses:
H. W. BRINKERHOFF,
WILLIAM C. WESTERVELT.